US010643156B2

(12) United States Patent
Omitaomu et al.

(10) Patent No.: US 10,643,156 B2
(45) Date of Patent: May 5, 2020

(54) PRECISION SNOW REMOVAL ANALYSIS

(71) Applicant: UT-Battelle, LLC, Oak Ridge, TN (US)

(72) Inventors: Olufemi A. Omitaomu, Knoxville, TN (US); Budhendra L. Bhaduri, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 697 days.

(21) Appl. No.: 15/459,036

(22) Filed: Mar. 15, 2017

(65) Prior Publication Data
US 2018/0031736 A1 Feb. 1, 2018

Related U.S. Application Data

(60) Provisional application No. 62/367,204, filed on Jul. 27, 2016.

(51) Int. Cl.
*G06Q 10/06* (2012.01)
*G01S 17/95* (2006.01)
*G01V 99/00* (2009.01)
*G01S 17/89* (2020.01)

(52) U.S. Cl.
CPC ............ *G06Q 10/063* (2013.01); *G01S 17/95* (2013.01); *G01S 17/89* (2013.01); *G01V 99/005* (2013.01); *Y02A 90/19* (2018.01)

(58) Field of Classification Search
CPC ....... G01S 17/89; G01S 17/95; G01V 99/005; G01W 1/12; G06Q 10/063; Y02A 90/19; Y04S 10/54
See application file for complete search history.

(56) References Cited

U.S. PATENT DOCUMENTS

| 7,305,983 | B1 * | 12/2007 | Meder | G01W 1/12 |
| | | | | 126/621 |
| 10,429,197 | B1 * | 10/2019 | Carrino | H04W 4/02 |
| 2003/0023412 | A1 * | 1/2003 | Rappaport | G06Q 10/10 |
| | | | | 703/1 |

(Continued)

OTHER PUBLICATIONS

Pinde Fu and Paul Rich, "Design and Implementation of the Solar Analyst: An ArcView Extension for Modeling Solar Radiation at Landscape Scales," Proceedings of the Nineteenth Annual ESRI User Conference, 1999.

(Continued)

*Primary Examiner* — Manuel A Rivera Vargas
*Assistant Examiner* — Yaritza H Perez Bermudez
(74) *Attorney, Agent, or Firm* — Colin L. Cini; Dan V. Vacar

(57) ABSTRACT

A method for precision snow removal analysis provides a melt rate in inches per day for roadways in a geometric region is provided. Elevation data is used to calculate upward looking hemispherical viewsheds at each roadway coordinate to determine the total solar radiation. The snowmelt capacity and slope are determined at each coordinate and the data is displayed on a geographical map of the roadway. The processing speed of the computer is improved since the snowmelt capacity is only determined for a roadway subset of the region coordinates.

17 Claims, 3 Drawing Sheets

(3 of 3 Drawing Sheet(s) Filed in Color)

(56) References Cited

U.S. PATENT DOCUMENTS

2017/0365094 A1* 12/2017 Liu .................... G06T 17/05

OTHER PUBLICATIONS

Pinde Fu and Paul Rich, "A Geometric Solar Radiation Model and Its Applications in Agriculture and Forestry," Proceedings of the Second International Conference on Geospatial Information in Agriculture and Forestry, 2000, I-357-364.

Pinde Fu and Paul Rich, "A Geometric Solar Radiaton Model with Applications in Agriculture and Forestry," Computers and Electronics in Agriculture 37, 2002, pp. 25-35.

Kodysh, Jeffrey B., et al., Methodology for Estimating Solar Potential on Multiple Building Rooftops for Photovoltaic Systems, Sustainable Cities and Society, pp. 31-41, vol. 8.

* cited by examiner

PRECISION SNOW REMOVAL ANALYSIS

CROSS-REFERENCE TO RELATED APPLICATIONS

This application claims priority to U.S. provisional patent application Ser. No. 62/367,204, filed on 27 Jul. 2016, and incorporated herein by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

THE NAMES OF THE PARTIES TO A JOINT RESEARCH AGREEMENT

None.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

None.

STATEMENT REGARDING PRIOR DISCLOSURES BY THE INVENTOR OR A JOINT INVENTOR

A poster entitled, "Intelligent Snow Removal Analysis" was displayed in a public forum on 7 Aug. 2015.

BACKGROUND OF THE INVENTION

1. Field of the Invention

The present disclosure relates to roadway maintenance and more specifically to methods for analyzing snow melt capacities on roadways and other traffic infrastructure.

2. Description of the Related Art

Snow and ice mitigation is essential to any developed area susceptible to winter storms. Icy and obstructed roads can lead to business, school and government closures, and increase in traffic accidents, and possibly death. The economic impact of snow-related closures far exceeds the cost of timely snow removal. The direct costs of a one-day snow related shutdown in a major city, from loss of wages, tax revenue and retail sales due to impassable roads can easily exceed 10 million USD. Consequently, clear and safe roads are essential to any developed society. Still, cities and states generally can only allocate funds and resources for snow mitigation at a rate proportional to the expected snowfall or less. This creates an urgent need for snow and ice mitigation optimization for any snow susceptible area. In areas where snow is historically less prevalent this need is even more pressing, because any variability in snowfall could deplete the snow-removal budget early in the season.

Current salt distribution systems spread salt, sand or brine uniformly across the road network prior to, or during a storm. Salt application in environmentally sensitive areas and public watersheds can significantly damage those areas. Distributing salt on roadways with high solar melt rates wastes salt needlessly without improving safety. Because sunlight generally has the most important effect on snow melt and the fact that granular spatial variability affects observed sunlight, the current salt distribution approach can be improved if salt distribution could be adjusted for the solar potential of the road network at a high granularity.

What is needed is a method of calculating the solar potential of the road network at a high granularity in order to save material without compromising public safety.

BRIEF DESCRIPTION OF THE SEVERAL VIEWS OF THE DRAWING(S)

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
FIG. 1 is a snow melt capacity map of a roadway located in Knox County, Tenn.

To estimate the solar radiation on a road, the time sunlight is accessible to the road must be accounted for, and every point on Earth receives different radiation amounts due to variations in Earth's topology. For roads specifically, received solar radiation is impacted by the time of the year, weather, road slope and aspect, and shading effects. Shading effects from trees, shrubs, neighboring infrastructure etc. have a negative impact on a road's solar radiation potential. Road slope is also important, because the incline increases or decreases the amount of time the road can receive direct sunlight. The importance of the orientation of the slope, aspect, is noted with the fact that snow on the north side of mountains in the Northern Hemisphere often remain up to two weeks after snow on the southern side has melted. Observation shows shading effects, slope, and aspect to be granular.

A solar potential map is derived from a Digital Elevation Model (DEM). The DEMs that are used with spatial solar radiation models are most often created from high resolution Light Detection and Ranging (LIDAR) data. LiDAR is a technology that is used for determining the topography of earth's surface, including natural and man-made features in a standard format. LiDAR has a typical vertical accuracy of 15 cm to 20 cm and horizontal accuracy of 0.3 meter to 1.0 meter. LiDAR data for DEM creation purposes is usually collected from aircraft-based LiDAR sensors. The aerial LiDAR sensors transmit billions of laser light pulses in visible and near infer-red wave lengths to the earth's surface as an aircraft flies in a grid pattern. Upon hitting solid objects on the earth's surface, the beams are reflected back to the LiDAR sensor. Much like how SOund Navigation And Ranging (SONAR) is used for locating objects or surfaces underwater, LiDAR elevation data are calculated by measuring the time required for the signal to travel to the object surface and back to the sensor.

High-resolution LiDAR is used to map topographic features, as well as to identify objects on the surface of the earth, such as buildings, power lines, trees, and other visible features; many different useful geospatial products can be produced from LiDAR, including contour maps, slope and aspect maps, three-dimensional buildings, and virtual reality visualizations. To this end, many county and state governments in the United States have collected high-resolution aerial LiDAR for various urban planning, cadastral mapping, and environmental projects in their areas of governance. The LiDAR X/Y/Z coordinate returns are converted into individual Geographic Information Systems (GIS) datasets with X being longitude, Y being latitude and Z being elevation per standard file format. These DEMs are used to calculate solar radiation effects with approximately 1-meter resolution.

Road surface outlines for a particular city, county or state are acquired from GIS, Global Positioning Systems (GPS) or other electronic coordinate data. GIS mapping is mainly used for planning, tax calculations and other purposes. Data of interest for the disclosed method includes boundary coordinates of general roadways including all roads, bridges, parking lots and all other areas that vehicles travel or park on. The roadway surface GIS data provides the coordinates of interest, so that only the pixels of the DEM that are of interest are calculated for the snow melt capacity map, thus saving computational resources of the processor and improving the speed of the map generation. The road surface data are typically stored in one or more layers or data sets of the GIS database. Using this method, we developed high resolution solar insolation maps for the road network in Knox County, Tenn., United States of America.

Upward looking hemispherical viewsheds are calculated for every X/Y coordinate in the DEM that coincides with a roadway surface in the GIS data. A Hemispherical Viewshed Algorithm is based on the area-based spatial model for solar radiation as developed by Fu and Rich (1999, 2000) and implemented in the Spatial Analyst extension of ArcGIS. A publication entitled, "Design and implementation of the Solar Analyst: an ArcView extension for modeling solar radiation at landscape scales", Proceedings of the Nineteenth Annual ESRI User Conference discloses the algorithm in great detail and is incorporated herein by reference.

In summary, the hemispherical viewshed algorithm of Fu and Rich is comprised of three stages of computation—viewshed, sunmap, and skymap calculations. The viewshed stage determines which part of each pixel is in visible or obstructed sky directions. This is achieved by searching in a specified set of angular directions around a pixel, point or node location of interest and determining the maximum angle of sky obstruction. For the unsearched directions, the horizon angles are calculated using interpolation. One can describe this stage as a process in which an upward-looking hemispherical photograph is placed on each grid cell and the camera captures which sky directions are visible and which are obscured by a building, tree or other obstruction.

Each grid cell is assigned a value that corresponds with visible versus obstructed sky direction. The grid cell location, row and column, corresponds to a zenith angle θ (angle relative to the zenith) and an azimuth angle α (angle relative to north) on the hemisphere of directions. Once the values for the sky directions are captured, the next step creates a raster representation that specifies suntracks—the apparent position of the sun as it varies through time. The position of the sun (zenith and azimuth angles) is calculated based on latitude, day of year, and time of day using standard astronomical formulae. Zenith and azimuth angles are projected into two-dimensional grids with the same resolution used for viewsheds.

Two sunmaps are created: the first sunmap represents periods between the winter solstice and the summer solstice (December 22 to June 22); and the second sunmap represents periods between the summer solstice and the winter solstice (June 22 to December 22).

The third step is a skymap calculation. This step divides the whole sky into a series of sky sectors defined by zenith and azimuth divisions. Sky sectors must be small enough so that the centroid zenith and azimuth angles reasonably represent the direction of the sky sector in subsequent calculations. In one example, a skymap with sky sectors is defined by 16 zenith divisions and 16 azimuth divisions, although other numbers of divisions may be used.

After the previous three calculations are completed, the viewshed is overlaid on skymap and sunmaps to enable calculation of diffuse and direct radiation received from each sky direction. The proportion of unobstructed sky area in each skymap or sunmap sector, gap fraction, is calculated by dividing the number of unobstructed cells by the total number of cells in that sector.

Once obstructed sky direction areas have been identified as described in the preceding step, solar radiation is then calculated based on atmospheric effects such as gap fraction, sun position, atmospheric attenuation and ground receiving surface orientation. The total solar radiation value is obtained for each location on the topographic surface, thus producing a solar radiation map for the whole area of interest. The total solar radiation or global solar radiation ($G_R$) is the sum of direct and diffuse solar radiation of all sectors and is defined by:

$$G_R = D_R + F_R$$

where $D_R$ is direct solar radiation for all sunmap sectors and $F_R$ is diffuse solar radiation for all skymap sectors. That is, $$D_R = \Sigma DR_{\theta,\alpha} \text{ and } D_F = \Sigma DF_{\theta,\alpha}.$$

The direct solar radiation from a sunmap sector with a centroid at zenith angle θ and azimuth angle α is given as:

$$DR_{\theta,\alpha} = K * \tau^{m(\theta)} * SD_{\theta,\alpha} * SG_{\theta,\alpha} * \cos(\beta_{\theta,\alpha})$$

where K is the solar constant and range from 1338 to 1368 $WM^{-2}$, but a value of 1367 $WM^{-2}$ was adopted by the Commission for Instruments and Methods of Observation in 1981; t is transmissivity of the atmosphere for the shortest path in the direction of the zenith; m(θ) is the relative optical path length; SD is the time duration represented by the sky factor; SG is the gap fraction for the sunmap sector; and $\beta_{\theta,\alpha}$ is the angle of incidence between the centroid of the sky sector and the axis normal to the surface. Similarly, the diffuse solar radiation for each sky sector at its centroid is defined as:

$$DF_{\theta,\alpha} = R_g * P_d * D * SYG_{\theta,\alpha} * W_{\theta,\alpha} * \cos(\beta_{\theta,\alpha})$$

where $R_g$ is the global normal solar radiation; $P_d$ is the proportion of global normal solar radiation flux that is diffused—it is approximately 0.2 for very clear sky conditions and 0.7 for very cloudy sky conditions; D is the time interval for analysis; $SYG_{\theta,\alpha}$ is the gap fraction, or the proportion of visible sky, for the sky sector; $W_{\theta,\alpha}$ is the proportion of diffuse radiation originating in a given sky sector relative to all sectors; and $\cos(\beta_{\theta,\alpha})$ is the angle of incidence between the centroid of the sky sector and the intercepting surface.

Using the GIS data set for a particular city, county or state, the insolation estimates for only the road, bridge and parking areas can now be extracted. Then, by applying the US Army Corps of Engineers' energy balance equation, the radiation component of the road snow melt capacity is calculated to 1-meter resolution. The energy balance equation is a snow melt heat transfer theory based on radiation, convection and conduction. Convection and conduction are generally less important factors than radiation.

$$M=k(0.00508*I)(1-a)$$

Where M is snowmelt capacity in inches per day, k is the basin short wave radiation factor (between 0.9-1.1), I is the observed or estimated total solar radiation and (a) is the observed or estimated snow surface albedo.

Figure 2:
FIG. 2 is a snow melt capacity map of another roadway in Knox County, Tenn.
Figure 3:
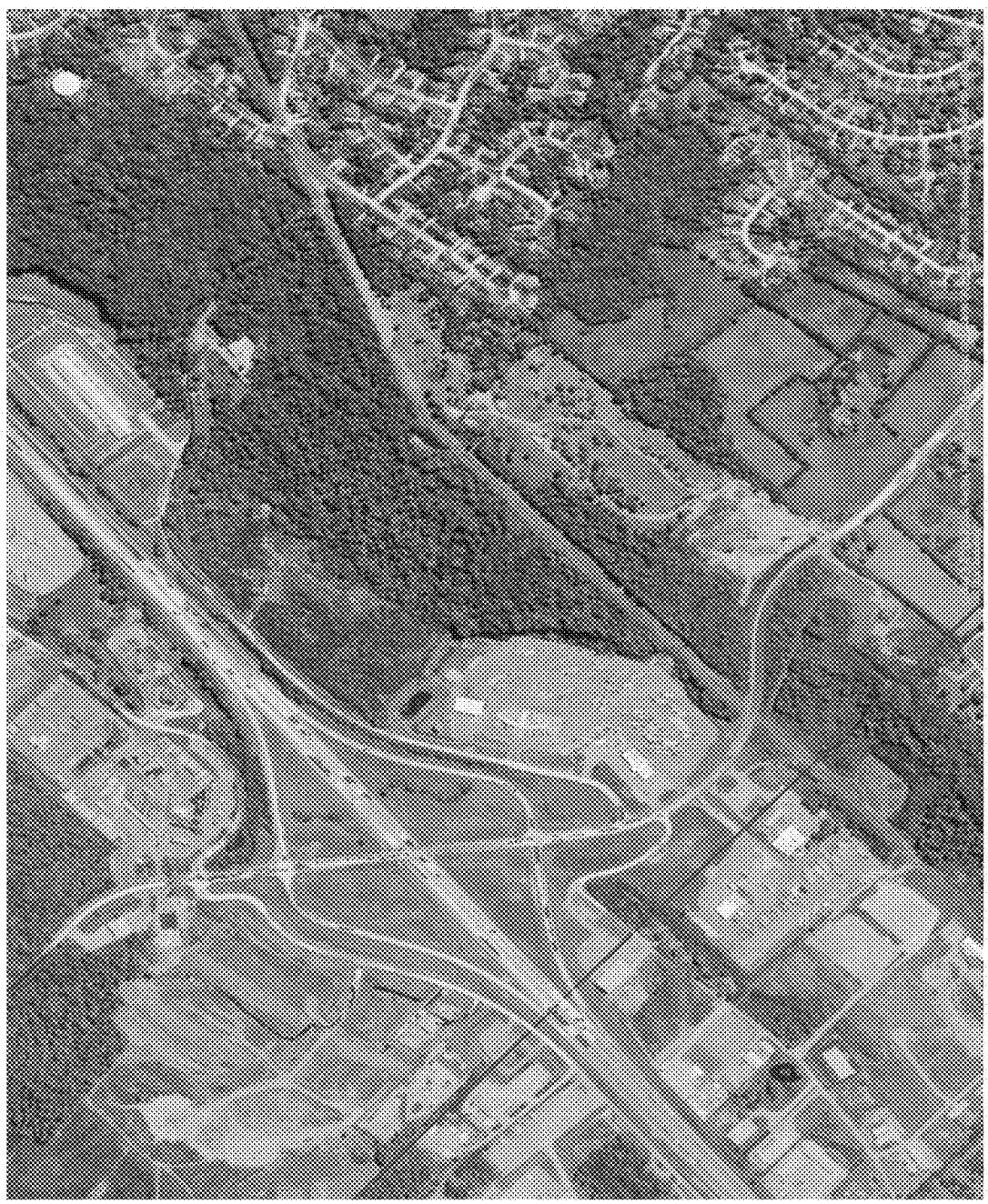
FIG. 3 is a snow melt capacity map of another roadway located adjacent to a boundary of Knox County, Tenn.

The snow melt capacity maps of FIGS. 1-3 indicate the daily snow melt rate in inches per day at 1-meter resolution for selected roadways in Knox County, Tenn., United States of America. In the figures, red and yellow colors indicate high calculated snow melt rates and green and blue colors indicate a low or zero calculated snow melt rates. Threshold snow melt rate values are assigned colors in the maps. For example, road pixel coordinates having a calculated melt rate between 0-inch and 1-inch per day, may be assigned a blue color; road pixel coordinates having a calculated melt rate between 1-inch and 2-inch per day, may be assigned a green color; road pixel coordinates having a calculated melt rate between 2-inch and 3-inch per day, may be assigned a yellow color; road pixel coordinates having a calculated melt rate between 3-inch and 4-inch per day, may be assigned an orange color; and road pixel coordinates having a calculated melt rate between 4-inch and 5-inch per day, may be assigned a red color. These color ranges are exemplary in nature and other ranges and colors may be used. For example, melt rates between 0.25 inch and 0.75 inch may be assigned a purple color. Essentially, each 1-meter resolution pixel coordinate within a roadway GIS area is associated with a calculated snow melt rate in Inches per day and the pixel XY coordinate pairs and melt rate data are stored in an electronic file.

In addition to snow melt rate, a slope parameter may also be calculated and used in the model. Elevation data can be easily converted to slope data in GIS programs such as ArcMap. The rate of snow melt is computed for different blocks of hours in the day (e.g., morning, afternoon, before dawn/after dusk). With the incident solar radiation data available at a 1-meter spatial resolution, "road sectors" are defined as aggregates of several 1-meter cells to obtain a larger area that is reasonable for effective salt dispensary. The aggregation of the 1-meter length to road sectors is achieved by clustering adjacent and similar cells into the same groups.

From a safety perspective, road vulnerability to snow should also account for road characteristics such as slope since hilly roads make driving more hazardous during snowfall accumulations. Therefore, we used a rule-based approach to combine the rate of snowmelt for each road segment with the respective road segment slope data to compute road vulnerability index (RVI) to snow. The RVI values are then used to classify the road segments into Most Vulnerable, More Vulnerable, or Vulnerable classifications as shown in Table 1 below.

TABLE 1

Roadway Classification

| | | Slope | | |
|---|---|---|---|---|
| | | High | Medium | Low |
| Snowmelt | Low | Most Vulnerable | Most Vulnerable | Most Vulnerable |
| | Medium | Most Vulnerable | Most Vulnerable | More Vulnerable |
| | High | Most Vulnerable | More Vulnerable | Vulnerable |

Provided below is an example of a suitable computing system in which the described innovations may be implemented. The computing system is not intended to suggest any limitation as to scope of use or functionality, as the innovations may be implemented in many different computing systems.

An exemplary computing system includes one or more processing units and memory. The processing units execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, a central processing unit as well as a graphics processing unit (GPU) or co-processing unit may be used. The tangible memory may be volatile memory (e.g., registers, cache, RAM), non-volatile memory (e.g., ROM, EEPROM, flash memory, etc.), or some combination of the two, accessible by the processing unit(s). The memory stores software implementing one or more innovations described herein, in the form of computer-executable instructions suitable for execution by the processing unit(s).

The above-described computing system may have additional features. For example, the computing system includes storage, one or more input devices, one or more output devices, and one or more communication connections. An interconnection mechanism such as a bus, controller, or network interconnects the components of the computing system. Typically, operating system software provides an operating environment for other software executing in the computing system, and coordinates activities of the components of the computing system.

The tangible storage may be removable or non-removable, and includes magnetic disks, magnetic tapes or cassettes, CD-ROMs, DVDs, or any other medium which can be used to store information in a non-transitory way and which can be accessed within the computing system. The storage stores instructions for the software implementing the one or more innovations described herein.

The input device(s) may be a touch input device such as a screen, keyboard, mouse, pen, or trackball, a voice input device, a scanning device, or another device that provides input to the computing system. For video encoding, the input device(s) may be a camera, video card, TV tuner card, or similar device that accepts video input in analog or digital form, or a CD-ROM or CD-RW that reads video samples into the computing system. The output device(s) may be a display, printer, speaker, CD-writer, or another device that provides output from the computing system.

The communication connection(s) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in the exemplary computing system on a target real or virtual processor. Generally, program modules include routines, programs, libraries, objects, classes, components, data structures, etc. that perform particular tasks or implement particular instructions. The functionality of the program modules may be combined or split between program modules as desired in various embodiments. Computer-executable instructions for program modules may be executed within a local or distributed computing system.

In one example of a computing environment, the cloud provides services for connected devices with a variety of screen capabilities. A connected device represents a device with a computer screen (e.g., a mid-size screen). For example, connected device could be a personal computer such as desktop computer, laptop, notebook, netbook, or the like. A connected device also represents a device with a mobile device screen (e.g., a small-size screen). For example, a connected device could be a mobile phone, smart phone, personal digital assistant, tablet computer, and the like. A connected device also represents a device with a large screen. For example, a connected device could be a television screen (e.g., a smart television) or another device connected to a television (e.g., a set-top box or gaming console) or the like. One or more of the connected devices can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment. For example, the cloud can provide services for one or more computers (e.g., server computers) without displays.

In an example environment, the cloud provides the technologies and solutions described herein to various connected devices using, at least in part, one or more service providers. For example, the service providers can provide a centralized solution for various cloud-based services. The service providers can manage service subscriptions for users and/or devices (e.g., for the connected devices and/or their respective users).

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the methods described. The technologies described herein can be implemented in a variety of programming languages.

The methods described may be used for controlling a precision snow removal device or a precision salt dispensing device. For example, the calculated snow melt rate data for the roadways may be matched to a present Global Positioning System (GPS) coordinate of the precision snow plow and/or precision salt dispensing device. In this example, only the volume of salt that is necessary to melt the snow based on its location is dispensed. In areas with low calculated snow melt rates, more salt is dispensed and, in areas with high snow melt rates, less salt is dispensed. When road segments classifications are used for prioritization, roads that are classified as most vulnerable are treated first, with subsequent treatment of more vulnerable roads and finally vulnerable roads are treated last. This method allows county and state road crews to apply salt, sand and brine only where necessary. Thus, saving time and money and without sacrificing public safety.

While this disclosure describes and enables several examples of a precision snow removal analysis method, other examples and applications are contemplated. Accordingly, the invention is intended to embrace those alternatives, modifications, equivalents, and variations as fall within the broad scope of the appended claims. The technology disclosed and claimed herein may be available for licensing in specific fields of use by the assignee of record.

What is claimed is:

1. A method for precision snow removal analysis comprising the steps of:
    a) acquiring Digital Elevation Model (DEM) coordinate data of a geographical area in an electronic file format;
    b) acquiring a roadway surface subset of Geographic Information System (GIS) coordinate data in the geographical area in an electronic file format;
    c) calculating with a computer the upward looking hemispherical viewsheds for each coordinate in the DEM that is geographically within the roadway surface subset of the GIS coordinate data;
    d) calculating with the computer the total solar radiation for each coordinate in the DEM that coincides geographically within the roadway surface subset of the GIS coordinate data;
    e) calculating with the computer the snowmelt capacity in inches per day, using the total solar radiation, for each coordinate in the DEM that resides within the roadway surface subset of the GIS coordinate data; and
    f) displaying the snowmelt capacity in inches per day for each coordinate in the DEM that resides within the roadway surface subset of the GIS coordinate data on a colorized map with a computer display device.

2. The method of claim 1 wherein the acquiring step a) utilizes a Light Detection and Ranging (LiDAR) method to acquire the DEM coordinate data.

3. The method of claim 1 wherein the calculating step c) comprises a three step method of calculating a viewshed, a sunmap, and a skymap for each coordinate in the DEM that resides within the roadway surface subset of the GIS coordinate data.

4. The method of claim 3 wherein each skymap is defined by 16 zenith divisions and 16 azimuth divisions.

5. The method of claim 1 wherein the calculating step d) includes calculating a direct solar radiation and a diffuse solar radiation.

6. The method of claim 1 wherein the displaying step f) includes assigning a color to each coordinate in the DEM that resides within the roadway surface subset of the GIS coordinate data to visually indicate the snowmelt capacity in inches per day.

7. The method of claim 6 wherein red and yellow colors indicate higher calculated snow melt rates and green and blue colors indicate a lower or zero calculated snow melt rates.

8. The method of claim 1 wherein the calculating step e) also includes calculating a slope for each coordinate in the DEM that resides within the roadway surface subset of the GIS coordinate data and using the slope and snowmelt calculations for classifying the roadway vulnerability.

9. A method for creating a snowmelt map for roadways comprising the steps of:
   a) acquiring a first coordinate data set having a horizontal accuracy of 15 cm to 20 cm and an elevation accuracy of 0.3 meter to 1.0 meter;
   b) acquiring a second coordinate data set of a roadway surface that resides geographically within the first coordinate data set;
   c) calculating with a computer the upward looking hemispherical viewsheds for each roadway coordinate in the second coordinate data set using the corresponding elevation data in the first coordinate data set;
   d) calculating with the computer the total solar radiation for each roadway coordinate in the second coordinate data;
   e) calculating with the computer the snowmelt capacity in inches per day for each roadway coordinate in the second coordinate data; and
   f) displaying a visual representation of the snowmelt capacity in inches per day for each roadway coordinate in the second coordinate data with a computer display device.

10. The method of claim 9 wherein the acquiring step a) utilizes a Light Detection and Ranging (LiDAR) method to acquire the first coordinate data set.

11. The method of claim 9 wherein the calculating upward looking hemispherical viewsheds step c) comprises a three step method of calculating a viewshed, a sunmap, and a skymap for each coordinate in the second coordinate data set.

12. The method of claim 11 wherein each skymap is defined by 16 zenith divisions and 16 azimuth divisions.

13. The method of claim 9 wherein the calculating step d) includes calculating a direct solar radiation and a diffuse solar radiation.

14. The method of claim 9 wherein the displaying step f) includes assigning a color to each coordinate in the second coordinate data set to visually indicate the snowmelt capacity in inches per day.

15. The method of claim 14 wherein red and yellow colors indicate higher calculated snow melt rates and green and blue colors indicate a lower or zero calculated snow melt rates.

16. The method of claim 9 wherein the calculating step d) also includes calculating a slope for each roadway coordinate in the second coordinate data and using the slope and snowmelt calculations for classifying the roadway vulnerability.

17. A method for creating a snowmelt dataset for roadways where a snowmelt capacity in inches per day is calculated for only a subset of a Digital Elevation Model (DEM) coordinate dataset and where the subset contains only the coordinates that are associated with a roadway in 1-meter resolution.

* * * * *